United States Patent
Mizuno et al.

(10) Patent No.: US 10,734,134 B2
(45) Date of Patent: Aug. 4, 2020

(54) WIRE HARNESS AND METHOD FOR MANUFACTURING THEREOF

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Housei Mizuno, Mie (JP); Hiroki Hirai, Mie (JP); Makoto Higashikozono, Mie (JP); Tooru Tanji, Osaka (JP); Junichi Shirakawa, Mie (JP); Koichiro Goto, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/349,053

(22) PCT Filed: Oct. 24, 2017

(86) PCT No.: PCT/JP2017/038248
§ 371 (c)(1),
(2) Date: May 10, 2019

(87) PCT Pub. No.: WO2018/088190
PCT Pub. Date: May 17, 2018

(65) Prior Publication Data
US 2019/0287696 A1    Sep. 19, 2019

(30) Foreign Application Priority Data

Nov. 11, 2016 (JP) .................................. 2016-220165
Jun. 1, 2017 (JP) .................................. 2017-109084

(51) Int. Cl.
B60R 13/08 (2006.01)
C09J 7/00 (2018.01)
(Continued)

(52) U.S. Cl.
CPC ............ *H01B 7/0045* (2013.01); *B60R 13/08* (2013.01); *B60R 16/0207* (2013.01); *C09J 7/00* (2013.01);
(Continued)

(58) Field of Classification Search
CPC .......... H01B 7/00; H01B 13/012; H01B 7/18; B60R 13/02; B60R 16/02
(Continued)

(56) References Cited

U.S. PATENT DOCUMENTS 4,415,765 A * 11/1983 Iwasa ..................... H01B 7/365
                                                         174/112
6,289,832 B1 * 9/2001 Kitamura ................ D05B 69/36
                                                         112/273
(Continued)

FOREIGN PATENT DOCUMENTS

CN        102333680        1/2012
CN        204334935        5/2015
(Continued)

OTHER PUBLICATIONS

Office Action issued in Japan Counterpart Patent Appl. No. 2018-139433, dated Mar. 5, 2019, along with an English translation thereof.
(Continued)

*Primary Examiner* — Timothy J Thompson
*Assistant Examiner* — Michael F McAllister
(74) *Attorney, Agent, or Firm* — Greenblum & Bernstein, P.L.C.

(57) ABSTRACT

A wire harness includes a functional exterior component, at least one electric wire, and at least one thread. The func-
(Continued)

tional exterior component is shaped into a sheet. The electric wire is disposed on one main surface of the functional exterior component. With the thread the electric wire is sewn on the functional exterior component.

10 Claims, 9 Drawing Sheets

(51) Int. Cl.
 *H01B 7/04* (2006.01)
 *H01B 13/012* (2006.01)
 *H02G 3/02* (2006.01)
 *H01B 7/00* (2006.01)
 *B60R 16/02* (2006.01)

(52) U.S. Cl.
 CPC ............ *H01B 7/04* (2013.01); *H01B 13/012* (2013.01); *H02G 3/02* (2013.01)

(58) Field of Classification Search
 USPC ...................................................... 174/110 R
 See application file for complete search history.

(56) References Cited

U.S. PATENT DOCUMENTS

| 8,276,882 | B2* | 10/2012 | Jockisch | ............. H02G 3/0462 |
| | | | | 254/134 |
| 8,646,397 | B2* | 2/2014 | Ysbrand | ................ D05B 23/00 |
| | | | | 112/136 |
| 10,011,925 | B2 | 7/2018 | Kurahashi et al. | |
| 2003/0044155 | A1* | 3/2003 | Maiden | .................... D03D 3/02 |
| | | | | 385/137 |
| 2003/0235048 | A1* | 12/2003 | Gyori | ................ A41D 19/0157 |
| | | | | 362/103 |
| 2010/0025644 | A1* | 2/2010 | Jockisch | ............. H02G 3/0462 |
| | | | | 254/134.3 R |
| 2011/0290557 | A1 | 12/2011 | Satou et al. | |
| 2012/0152160 | A1* | 6/2012 | Ysbrand | ................ D05B 23/00 |
| | | | | 112/475.08 |
| 2014/0084045 | A1* | 3/2014 | Yang | .................... A61B 5/6804 |
| | | | | 228/175 |
| 2017/0215495 | A1* | 8/2017 | Okumiya | ................ G01B 7/16 |

FOREIGN PATENT DOCUMENTS

| CN | 205104612 | 3/2016 |
| JP | 2001-55660 | 2/2001 |
| JP | 2011-228371 | 11/2011 |
| JP | 2015-72798 | 4/2015 |
| JP | 5993493 | 8/2016 |
| TW | 285882 | 1/2006 |

OTHER PUBLICATIONS

Office Action issued in Japan Counterpart Patent Appl. No. 2017-109084, dated Jun. 12, 2018, along with an English translation thereof.
Office Action issued in Japan Counterpart Patent Appl. No. 2018-139433, dated Jan. 22, 2019, along with an English translation thereof.
International Search Report issued in WIPO Patent Application No. PCT/JP2017/038248, dated Nov. 28, 2017, along with English translation.
International Preliminary Report on Patentability issued in WIPO Patent Application No. PCT/JP2017/038248, dated May 23, 2019, along with English translation.
Chinese Office Action, Chinese Patent Office, Application No. 201780067426.0, dated Dec. 2, 2019, with English machine translation.

* cited by examiner

WIRE HARNESS AND METHOD FOR MANUFACTURING THEREOF

TECHNICAL FIELD

This invention relates to a technology for attaching electric wires to an exterior component in a wire harness for vehicle.

BACKGROUND ART

Patent Document 1 discloses a technology, when a sheet-shaped exterior component is attached to electric wires, for positioning the exterior component with respect to the electric wires by winding a tape around each terminal portion of the exterior component and the electric wires protruding from the terminal portion.

PRIOR ART DOCUMENT

Patent Document

Patent Document 1: Japanese Patent Application Laid-Open No. 2015-72798

SUMMARY

Problem to be Solved by the Invention

Here, various components having at least one function of soundproofing (sound-damping, sound absorption, sound insulation, etc.), protection (abrasion resistance, tensile resistance, etc.), heat radiation, shielding, waterproofing, etc. are used as the exterior components in the wire harness for vehicle. If the various components have different structures for attaching these various components to electric wires, the number of process types commensurately increase.

The object of the present invention is to provide a structure applicable in common to various exterior components upon attachment to electric wires.

Means to Solve the Problem

To solve the problem, a wire harness according to a first aspect includes: a functional exterior component shaped into a sheet; at least one electric wire disposed on one main surface of the functional exterior component; and at least one thread for sewing the electric wire on the functional exterior component.

A wire harness according to a second aspect is the wire harness according to the first aspect, and the functional exterior component includes a soundproof component with soundproofing properties.

A wire harness according to a third aspect is the wire harness according to the first or the second aspect, and the functional exterior component includes a shielding component capable of shielding the electric wire.

A wire harness according to a fourth aspect is the wire harness according to one of the first aspect to the third aspect, and the functional exterior component includes a protective component capable of protecting the electric wire from abrasion, the protective component having abrasion resistance.

A wire harness according to a fifth aspect is the wire harness according to one of the first aspect to the fourth aspect, and the functional exterior component includes a heat radiating component capable of radiating heat of the electric wire.

A wire harness according to a sixth aspect is the wire harness according to the fifth aspect, and a high emission ratio portion is formed on a surface of the heat radiating component, the high emission ratio portion being higher in emission ratio than an inner portion of the heat radiating component.

A wire harness according to a seventh aspect is the wire harness according to one of the first aspect to the sixth aspect, and the functional exterior component functions as a tension member subjected to tensile force applied to the electric wire.

A wire harness according to an eighth aspect is the wire harness according to one of the first aspect to the seventh aspect, and in the functional exterior component, a tensile strength in a direction along an extension direction of the electric wire is higher than a tensile strength in a direction orthogonal to the direction.

A wire harness according to a ninth aspect is the wire harness according to one of the first aspect to the eighth aspect, and the functional exterior component is waterproofed, and covers the electric wire and a portion on which the electric wire is sewn.

A wire harness according to a tenth aspect is the wire harness according to one of the first aspect to the ninth aspect, and a connector provided at an end of the electric wire is sewn on the functional exterior component.

A wire harness according to an eleventh aspect is the wire harness according to one of the first aspect to the tenth aspect, and a fastening component for fastening the electric wire to a mounting object is sewn on the functional exterior component.

A wire harness according to a twelfth aspect is the wire harness according to one of the first aspect to the eleventh aspect, and the electric wire is sewn with the thread that is a single thread.

A wire harness according to a thirteenth aspect is the wire harness according to one of the first aspect to the eleventh aspect, and the electric wire is sewn with the at least one thread including an upper thread and a lower thread.

A method for manufacturing the wire harness according to a fourteenth aspect is a method for manufacturing the wire harness according to the twelfth aspect, and includes the steps of: (a) inserting a needle into the functional exterior component from another main surface of the functional exterior component, the needle having an eye through which the thread passes as an upper thread; (b) forming a loop from the upper thread that has passed through the one main surface; and (c) threading the electric wire through the loop as a lower thread.

A method for manufacturing the wire harness according to a fifteenth aspect is a method for manufacturing the wire harness according to the thirteenth aspect, and includes the steps of: (a) disposing the electric wire on the one main surface of the functional exterior component; and (b) sewing the upper thread and the lower thread on the functional exterior component with the electric wire being sandwiched between one of the upper thread and the lower thread and the one main surface of the functional exterior component.

Effects of the Invention

According to the first to the fifteenth aspects, the electric wire is sewn on the exterior component with the thread. This structure can be applied in common to various exterior components upon attachment to electric wires.

Particularly, according to the second aspect, a soundproof structure can be easily given.

Particularly, according to the third aspect, the electric wire can be easily shielded.

Particularly, according to the fourth aspect, the electric wire can be easily protected.

Particularly, according to the fifth aspect, heat of the electric wire can be easily radiated.

Particularly, according to the sixth aspect, the heat radiation effect can be enhanced.

Particularly, according to the seventh aspect, the electric wire is hardly damaged even with application of the tensile force to the wire harness.

Particularly, according to the eighth aspect, the functional exterior component hardly ruptures even with application of the tensile force to the wire harness.

Particularly, according to the ninth aspect, the electric wire can be easily waterproofed.

Particularly, according to the tenth aspect, the connector can be easily positioned.

Particularly, according to the eleventh aspect, the fastening component can be easily attached.

Particularly, according to the twelfth aspect, the electric wire can be sewn with the minimal number of threads.

Particularly, according to the thirteenth aspect, the electric wire does not have to be used as an upper thread or a lower thread. Thus, an electric wire with difficulties in being applied as the upper thread or the lower thread, for example, a thick wire can be easily sewn.

Particularly, according to the fourteenth aspect, the electric wire can be sewn on the functional exterior component. Since a sewing machine is available herein, the wire harness can be easily manufactured.

Particularly, according to the fifteenth aspect, the electric wire can be sewn on the functional exterior component. Since a sewing machine is available herein, the wire harness can be easily manufactured.

DESCRIPTION OF EMBODIMENTS

Embodiment 1

Figure 1:
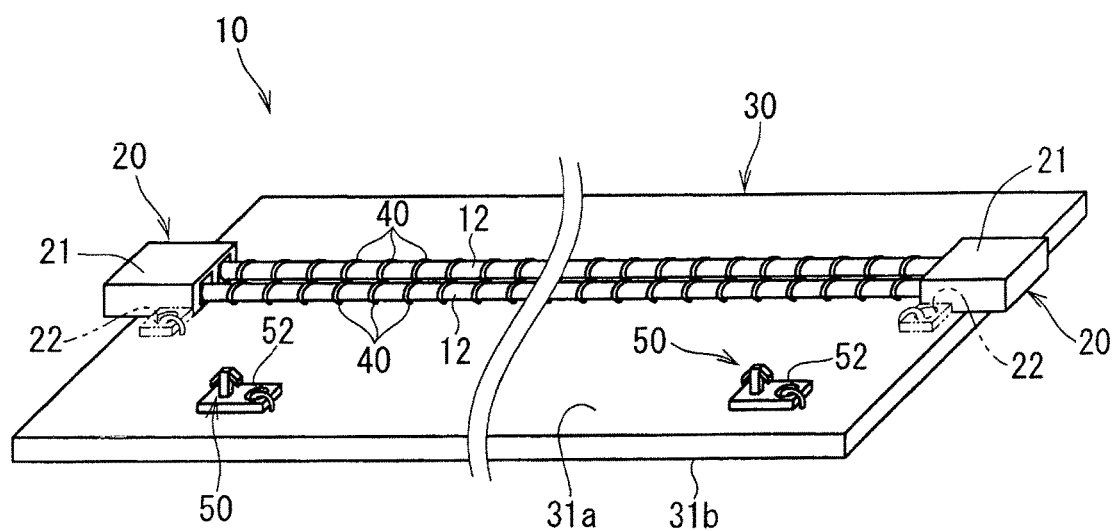
FIG. 1 illustrates a perspective view of a wire harness according to Embodiment 1.
Figure 2:
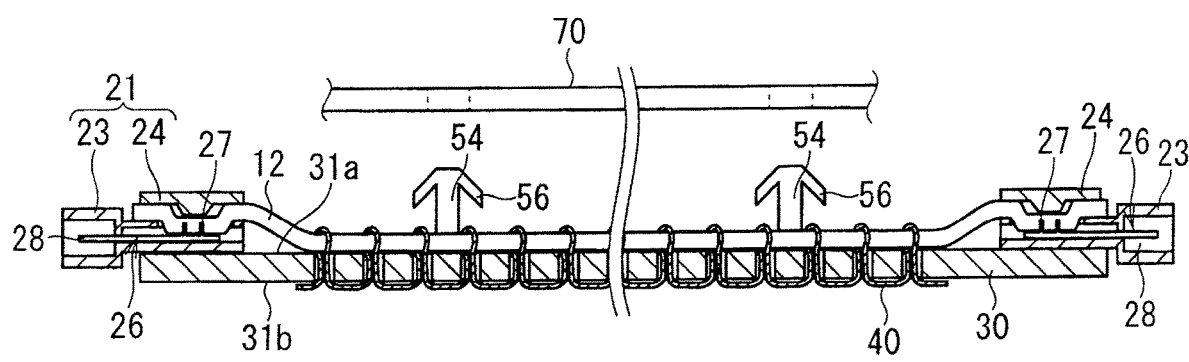
FIG. 2 illustrates a schematic cross-sectional view of the wire harness according to Embodiment 1.

A wire harness according to Embodiment 1 will be described. FIG. 1 illustrates a perspective view of a wire harness 10 according to Embodiment 1. FIG. 2 illustrates a schematic cross-sectional view of the wire harness 10 according to Embodiment 1. Note that FIG. 2 is a cross-sectional view of the wire harness 10 cut in a plane along an extension direction of electric wires 12.

The wire harness 10 is used as wiring for electrically connecting various electrical devices mounted on, for example, a vehicle. The wire harness 10 is routed around, for example, an installment panel, a roof, and a door in the vehicle. Specifically, the wire harness 10 includes a functional exterior component 30, the electric wires 12, and threads 40. The wire harness 10 additionally includes connectors 20 and fastening components 50.

The functional exterior component 30 is shaped into a sheet. In the example illustrated in FIG. 1, the functional exterior component 30 is shaped into a rectangular sheet. The shape of the functional exterior component 30 is not limited to the aforementioned shape, but can be appropriately changed according to, for example, the placement of the electric wires 12. The functional exterior component 30 is a component in which the electric wires 12 are covered. The functional exterior component 30 is a component having at least one of functions of soundproofing (sound-damping, sound absorption, sound insulation, etc.), protection (abrasion resistance, tensile resistance, penetration resistance, etc.), heat radiation, shielding, waterproofing, etc. for the electric wires 12. An appropriate one of the functions of the functional exterior component 30 is selected according to, for example, the properties of the electric wires 12 and an environment of a portion on which the electric wires 12 are disposed. Since the electric wires 12 are disposed in a portion that may rub against the surrounding components, an example where the functional exterior component 30 is a protective sheet (protective component) with abrasion resistance will be described.

The protective sheet is formed of a sheet material such as polyvinyl chloride (PVC), polypropylene (PP), or a nonwoven fabric. When the protective sheet is formed of a nonwoven fabric, the protective sheet may be, for example, hot-pressed. Consequently, the protective sheet can be hardened. The abrasion resistance of the protective sheet may be obtained from physical properties of its structure or from physical properties of the raw material. Although the protective sheet is formed flat in the example illustrated in FIG. 1, application of a structure having protrusions and depressions on an external surface of this protective sheet will be able to increase the abrasion resistance of the protective sheet. For another example, application of a structure with the nonwoven fabric hot-pressed will be able to harden the protective sheet and increase the abrasion resistance. For another example, application of a hard raw material as a material for the protective sheet will be able to increase the abrasion resistance.

The electric wires 12 are disposed on one main surface 31a of the functional exterior component 30. The number of the electric wires 12 may be at least one. Here, the number of the electric wires 12 is two or more (two in the example illustrated in FIG. 1). The description herein is given by applying, as the electric wires 12, insulated electric wires 12 each including a core wire 14 and an insulating coating 16 for coating the core wire 14 (see FIG. 9). The core wire 14 is made of a conductive material such as copper or aluminum. The core wire 14 may be a solid wire or a stranded wire. The insulating coating 16 may be formed by extrusion molding, for example, a resin around the core wire 14 or by applying, for example, varnish around the core wire 14 and baking the varnish. The core wires 14 that are bare may be used as the electric wires 12.

When a manufacturing method using, for example, a sewing machine is applied, the electric wires 12 preferably have a high tensile strength, which will be described later in detail. The electric wires 12 are preferably thin. In view of this, signal lines which are relatively thin are more suitable as the electric wires 12 than power lines which tend to be relatively thick.

The ends of the electric wires 12 are integrated with the connectors 20. While the wire harness 10 is disposed in a target portion in a vehicle, etc., the connectors 20 are connected to connectors of the various electrical devices mounted on the vehicle. Consequently, the wire harness 10 is used as the wiring for electrically connecting the various electrical devices mounted on the vehicle.

Here, the connectors 20 are also sewn on the functional exterior component 30. Connector housings 21 of the connectors 20 have holes 22 or depressions, etc. through which the connector housings 21 are sewn on the functional exterior component 30. The holes 22 or the depressions may be existing components formed on, for example, locking portions or cassette portions, or new dedicated components. It is not necessary to sew the connectors 20 on the functional exterior component 30. Here, the connector 20 may or may not be fastened to the functional exterior component 30 with another means such as an adhesive tape or an adhesive.

As illustrated in FIG. 2, the connectors 20 are the connectors 20 of insulation-displacement type. Specifically, the connector housings 21 each include a first component 23, and a second component 24 that can be incorporated into the first component 23. The first component 23 can hold an insulation-displacement contact 26 with an insulation-displacement part 27 exposed outside. The insulation-displacement part 27 is included in the insulation-displacement contact 26, and can be connected to the insulated electric wires 12 with pressure. The first component 23 houses a partner joint 28 to be connected to a partner conductor, with the partner conductor connectable. The partner joint 28 is included in the insulation-displacement contact 26. The second component 24 is disposed opposite to a portion of the first component 23 for holding the insulation-displacement part 27, and can press the insulated electric wires 12 toward the insulation-displacement part 27. The second component 24 presses the insulated electric wires 12 toward the insulation-displacement part 27, while the insulated electric wires 12 are located on the insulation-displacement part 27 in the insulation-displacement contact 26 held by the first component 23 without being peeled off. Consequently, a part of the insulation-displacement part 27 breaks the insulation coating of the insulated electric wires 12 to abut and be connected to the core wire 14.

Here, all the two electric wires 12 are sewn on the functional exterior component 30 with the threads 40 in the example illustrated in FIG. 1. When the number of the electric wires 12 included in the wire harness 10 is two or more, the electric wires 12 may include the electric wires 12 that are not sewn on the functional exterior component 30.

The two electric wires 12 are connected to the same connectors 20 in the example illustrated in FIG. 1. When the number of the electric wires 12 included in the wire harness 10 is two or more, the electric wires 12 may include the electric wires 12 that are connected to the different connectors 20.

The electric wires 12 are linearly disposed in the example illustrated in FIG. 1. The electric wires 12 may be curved. When the number of the electric wires 12 included in the wire harness 10 is two or more, the electric wires 12 linearly disposed and the electric wires 12 that are curved may coexist. Here, the plurality of the electric wires 12 may have branches on the functional exterior component 30.

The electric wires 12 are disposed closer to the center of the functional exterior component 30 in a width direction in the example illustrated in FIG. 1. The route along which the electric wires 12 are disposed with respect to the functional exterior component 30 is not limited to the one described above. The electric wires 12 may be disposed, for example, closer to the end of the functional exterior component 30 in the width direction. The electric wires 12 may, for example, extend diagonally to the functional exterior component 30.

The electric wires 12 are sewn on the functional exterior component 30 with the threads 40. The threads 40 are preferably components more flexible than the electric wires 12. The thread 40 preferably has a tensile strength higher than that of the electric wires 12. The thread 40 may be made of a natural fiber or a chemical fiber. The thread 40 may be a single yarn or a twisted yarn.

When the thread 40 may abut the surrounding components while being incorporated into a vehicle, the thread 40 preferably has abrasion resistance as high as, for example, a fishing line made of nylon or polyester etc.

As illustrated in FIG. 2, the one seamless thread 40 is applied as the thread 40 for sewing the one electric wire 12, and the electric wire 12 is sewn in a plurality of positions along the extension direction of the electric wire 12 with the single thread 40. While extending along another main surface 31b of the functional exterior component 30, the one seamless thread 40 partly passes through the one main surface 31a of the functional exterior component 30 to form a loop 85. Then, the electric wire 12 is threaded through the loop 85, so that the electric wire 12 is sewn.

It is not necessary to sew the one electric wire 12 with the one seamless thread 40. The thread 40 with which the electric wire 12 is partly sewn in one position and which is then cut in both of the ends may exist in a plurality of portions along the extension direction of the electric wires 12.

The fastening components 50 are components for fastening the electric wires 12 to a mounting object 70 such as a car body panel or a rod component. Here, the fastening components 50 are also sewn on the functional exterior component 30. The fastening components 50 are components referred to as clamps or clips, and each include a pillar part 54 and a wing part 56 extending from the tip of the pillar part 54.

The fastening components 50 have, for example, holes 52 or depressions through which the fastening components 50 are sewn on the functional exterior component 30. The holes 52 or the depressions may be existing components or new dedicated components.

In the example illustrated in FIG. 2, the fastening components 50 are attached to protrude on the one main surface 31a on which the electric wires 12 are disposed. The fastening components 50 enable the electric wires 12 to abut the mounting object 70, and can radiate the heat of the electric wires 12 through the mounting object 70. When the mounting object 70 is a component capable of protecting the electric wires 12, the mounting object 70 can protect one side of the electric wires 12, whereas the functional exterior component 30 can protect the other side of the electric wires 12. The fastening components 50 may be attached to protrude on the other main surface 31b.

[Manufacturing Method]

Next, a method for manufacturing the wire harness 10 according to Embodiment 1 will be described with reference to FIGS. 3 to 6. FIGS. 3 to 6 illustrate steps for manufacturing the wire harness 10 according to Embodiment 1.

First, the functional exterior component 30, the electric wire 12, the thread 40, and a needle 80 are prepared. Here, the needle 80 with an eye 82 is used. The eye 82 is provided at the tip of the needle 80. The thread 40 is threaded through the eye 82 as an upper thread 84.

Figure 3:
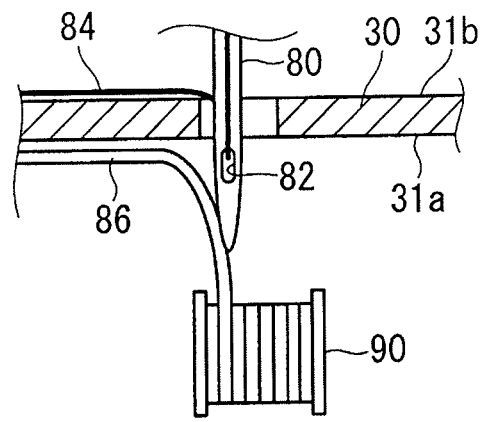
FIG. 3 illustrates steps for manufacturing the wire harness according to Embodiment 1.

Next as illustrated in FIG. 3, the needle 80 having the eye 82 through which the upper thread 84 is threaded is inserted into the functional exterior component 30 from the other main surface 31b (a step (a)). Consequently, a part of the upper thread 84 passes through the one main surface 31a together with the needle 80.

Figure 4:
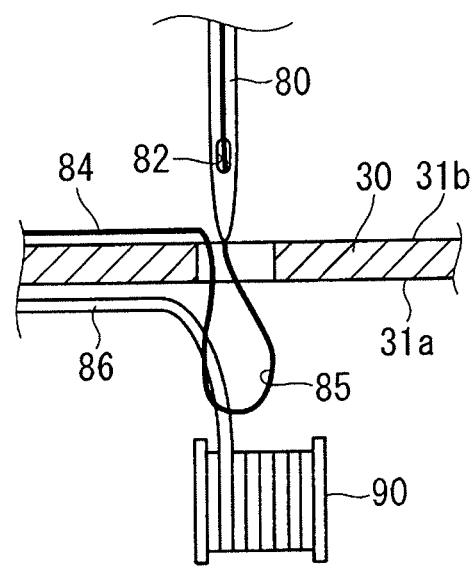
FIG. 4 illustrates the steps for manufacturing the wire harness according to Embodiment 1.

Next, the loop 85 is formed from the upper thread 84 that has passed through the one main surface 31a (a step (b)). For example, when the needle 80 is restored to the other main surface 31b as illustrated in FIG. 4, a part of the upper thread 84 that has passed through the one main surface 31a together with the needle 80 remains on the one main surface 31a to form the loop 85.

Figure 5:
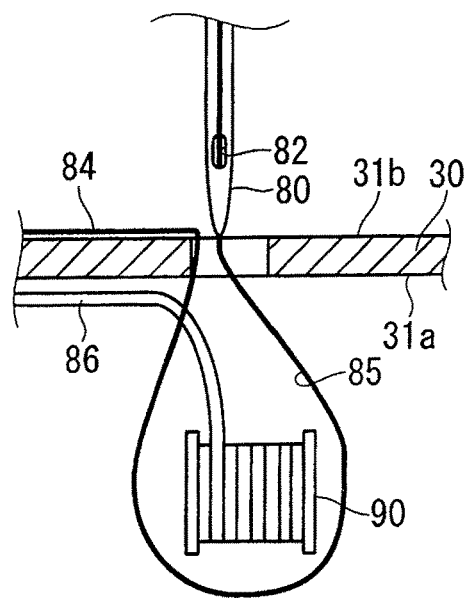
FIG. 5 illustrates the steps for manufacturing the wire harness according to Embodiment 1.

Next, the electric wire 12 functioning as a lower thread 86 is threaded through the loop 85 (a step (c)). First, the loop 85 is widened as illustrated in FIG. 5. Then, the loop 85 is rotated around a bobbin 90 that houses the wound lower thread 86 to allow the bobbin 90 to pass through the loop 85.

Figure 6:
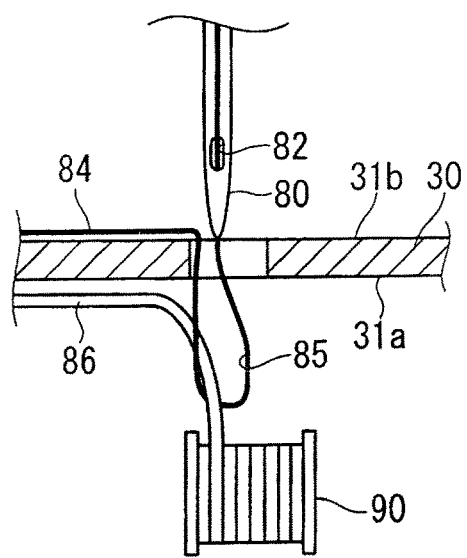
FIG. 6 illustrates the steps for manufacturing the wire harness according to Embodiment 1.

Then, the loop 85 is tightened to thread the lower thread 86 through the loop 85 as illustrated in FIG. 6. This completes the sewing of the electric wire 12 in the portion.

Repeating the same operations while the functional exterior component 30 is being conveyed enables the one electric wire 12 to be seamlessly sewn with the single thread 40.

Then, the connectors 20 and the fastening components 50 are additionally sewn on the exterior component 30 on which the electric wires 12 have been sewn. These may be sewn before the electric wires 12 are sewn. After the connectors 20 and the electric wires 12 are sewn, the ends of the electric wires 12 are connected to the insulation-displacement connectors 20. Consequently, the wire harness 10 is completed.

The sewing step in the manufacturing method may be performed by a sewing machine or by hand. Application of the sewing machine can automate part of the step.

When the sewing machine is used, a known rotary hook part in the sewing machine performs an operation of rotating the loop 85 around the bobbin 90 while widening the loop 85. Loosening the upper thread 84 more than the lower thread 86 can prevent the electric wire 12 functioning as the lower thread 86 from being pulled by the upper thread 84 toward the other main surface 31b of the functional exterior component 30.

According to the wire harness 10 structured as above and the manufacturing method thereof, the electric wires 12 are sewn on the functional exterior component 30 with the threads 40. This structure can be applied in common to the various functional exterior components 30 upon attachment to the electric wires 12. Since a sewing machine is available in the sewing step, the wire harness 10 can be easily manufactured.

Since the functional exterior component 30 has abrasion resistance, the electric wires 12 can be easily protected.

Since the fastening components 50 for fastening the electric wires 12 to the mounting object are also sewn on the functional exterior component 30, the fastening components 50 can be easily attached.

Since the connectors 20 provided at the ends of the electric wires 12 are also sewn on the functional exterior component 30, the connectors 20 can be easily positioned.

Embodiment 2

Figure 7:
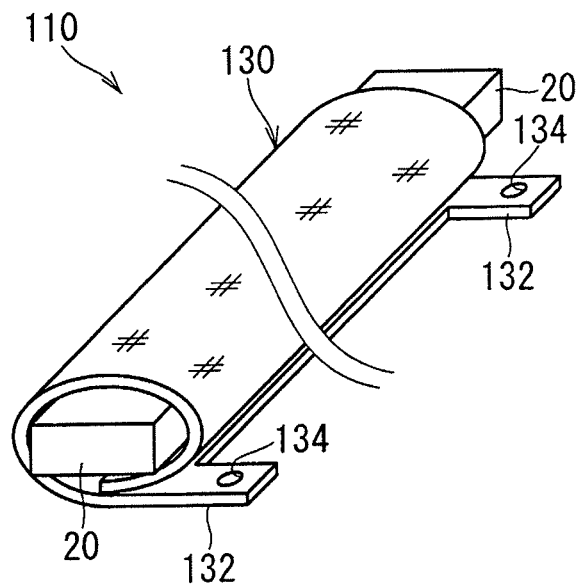
FIG. 7 illustrates a schematic perspective view of a wire harness according to Embodiment 2.

Next, a wire harness 110 according to Embodiment 2 will be described. FIG. 7 illustrates a schematic perspective view of the wire harness 110 according to Embodiment 2. In the following description of each Embodiment, the same reference numerals are assigned to the same constituent elements described above, and the description thereof will be omitted.

The wire harness 110 according to Embodiment 2 differs from the wire harness 10 according to Embodiment 1 in that a functional exterior component 130 is a shielding component having shielding properties.

The shielding component is formed from, for example, a metal foil, a metal mesh, a laminated component of a metal foil and a resin sheet, or a sheet material made of a conductive resin. The metal foil may be applied when the needle 80 can penetrate the shielding component using the metal foil. When, for example, the metal mesh is used, the needle 80 may be inserted into the holes provided in the mesh or penetrate a metal portion of the mesh. Here, the shielding component is flexible to the extent that it can be wound around the electric wires 12. The shielding component covers the surrounding of the electric wires 12 with the electric wires 12 sewn on the shielding component. This enables the shielding component to shield the electric wires 12 inside. The shielding component has fixed pieces 132 each with a screw hole 134. The shielding component is grounded with the fixed pieces 132 being fixed to, for example, a car body panel with bolts. The grounding method may include withdrawing a drain line abutting the shielding component or applying a part of the electric wires 12 sewn on the shielding component as a drain line.

The electric wires 12 can be easily shielded in the wire harness 110 with such a structure.

Embodiment 3

Figure 8:
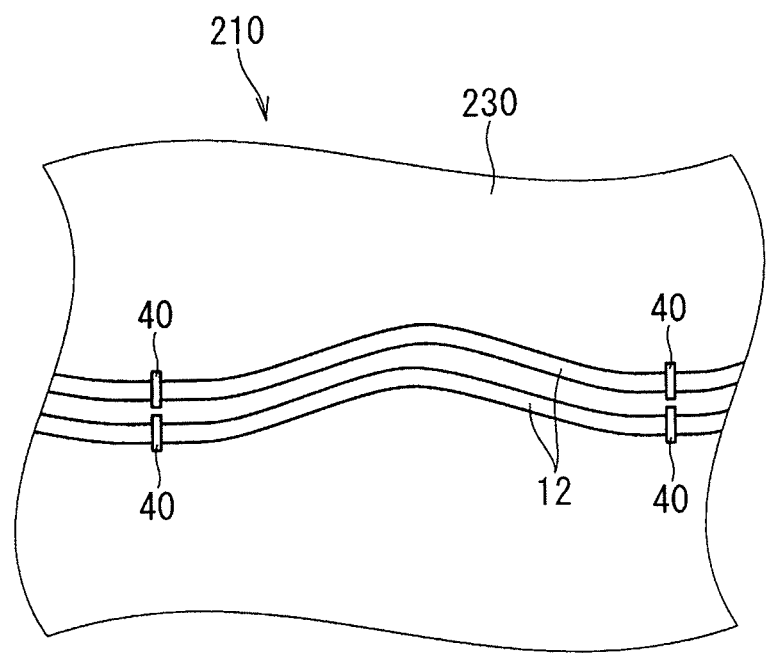
FIG. 8 illustrates a partial enlarged plan view of a wire harness according to Embodiment 3.

Next, a wire harness 210 according to Embodiment 3 will be described. FIG. 8 illustrates a partial enlarged plan view of the wire harness 210 according to Embodiment 3.

The wire harness 210 according to Embodiment 3 differs from the wire harness 10 according to Embodiment 1 in that a functional exterior component 230 is a tension member subjected to the tensile force applied to the electric wires 12.

For example, a sheet material that is less stretchable than the electric wires 12 will be used as the functional exterior component 230, and the part of the electric wires 12 sewn on the functional exterior component 230 will slack as illustrated in FIG. 8. The electric wires 12 will slack, for example, in a portion between adjacent seams. This enables the functional exterior component 230 to be subjected to the tensile force applied to the wire harness 210 along the extension direction of the electric wires 12. Consequently, it is possible to prevent the excessive tensile force from being applied to the electric wires 12.

The electric wires 12 are hardly damaged even with application of the tensile force to the wire harness 210 with such a structure.

Embodiment 4

Figure 9:
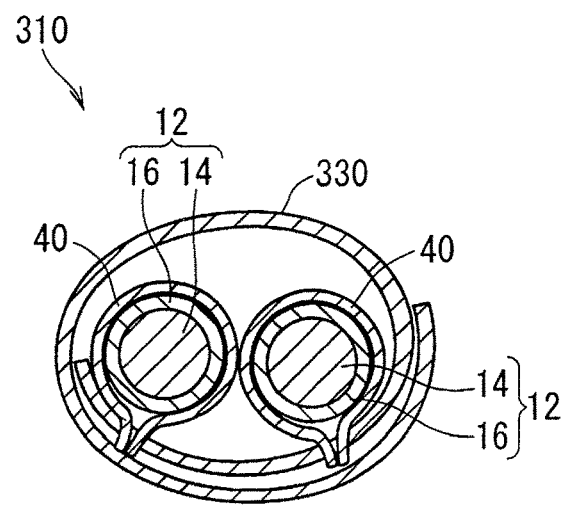
FIG. 9 illustrates a schematic cross-sectional view of a wire harness according to Embodiment 4.

Next, a wire harness 310 according to Embodiment 4 will be described. FIG. 9 illustrates a schematic cross-sectional view of the wire harness 310 according to Embodiment 4. Note that FIG. 9 is a cross-sectional view of the wire harness 310 cut in a plane orthogonal to the extension direction of the electric wires 12.

The wire harness 310 according to Embodiment 4 differs from the wire harness 10 according to Embodiment 1 in that a functional exterior component 330 is a waterproof sheet with waterproof properties.

The waterproof sheet is, for example, a polyethylene sheet. The waterproof sheet is flexible to the extent that it can be wound around the electric wires 12. The waterproof sheet covers the electric wires 12 and the surrounding of the seam portions, with the electric wires 12 sewn on the waterproof sheet. This prevents, for example, water from entering the inside of the waterproof sheet. The winding end portion of the waterproof sheet may be fixed by, for example, an adhesive tape or an adhesive without having any gap. It is not necessary that the waterproof sheet covers the electric wires 12 and the surrounding of the seam portions. The waterproof properties can be enhanced by filling seam holes of the waterproof sheet with a water sealant.

The electric wires 12 can be easily waterproofed in the wire harness 310 with such a structure.

Embodiment 5

Figure 10:
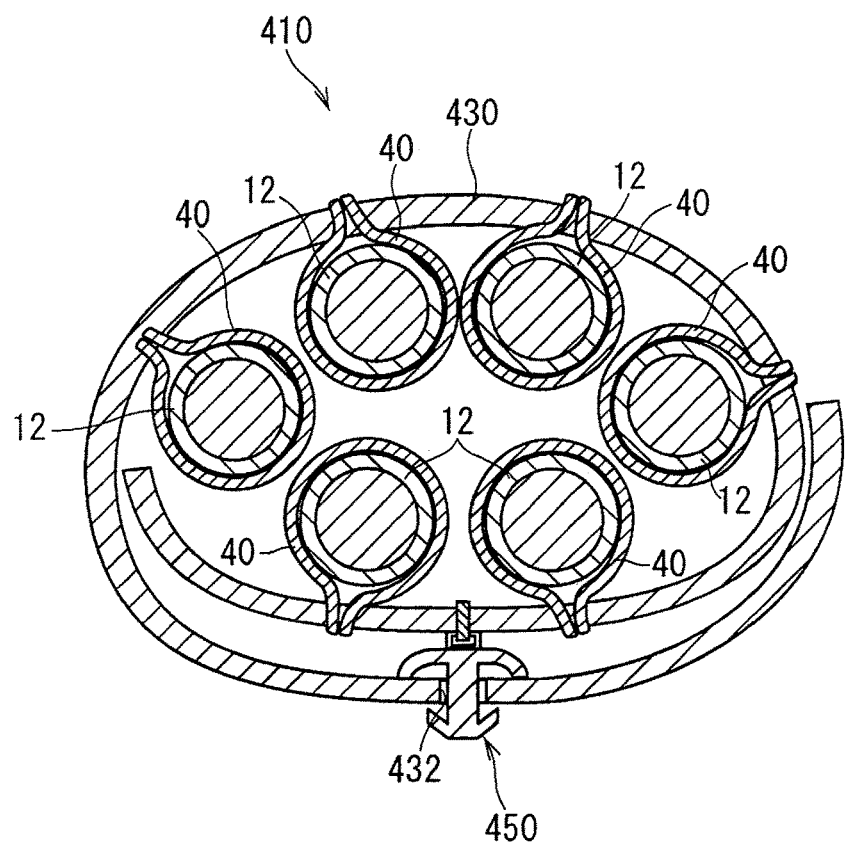
FIG. 10 illustrates a schematic cross-sectional view of a wire harness according to Embodiment 5.

Next, a wire harness 410 according to Embodiment 5 will be described. FIG. 10 illustrates a schematic cross-sectional view of the wire harness 410 according to Embodiment 5.

The wire harness 410 according to Embodiment 5 differs from the wire harness 10 according to Embodiment 1 in that a functional exterior component 430 is wound around the electric wires 12 and a fastening component 450 maintains the winding state.

In the functional exterior component 430, a through hole 432 into which a fastening portion of the fastening component 450 can be inserted may be formed in a portion overlapping a portion in which the fastening component 450 is provided.

The winding state of the functional exterior component 430 can be easily maintained in the wire harness 410 with such a structure.

Embodiment 6

Figure 11:
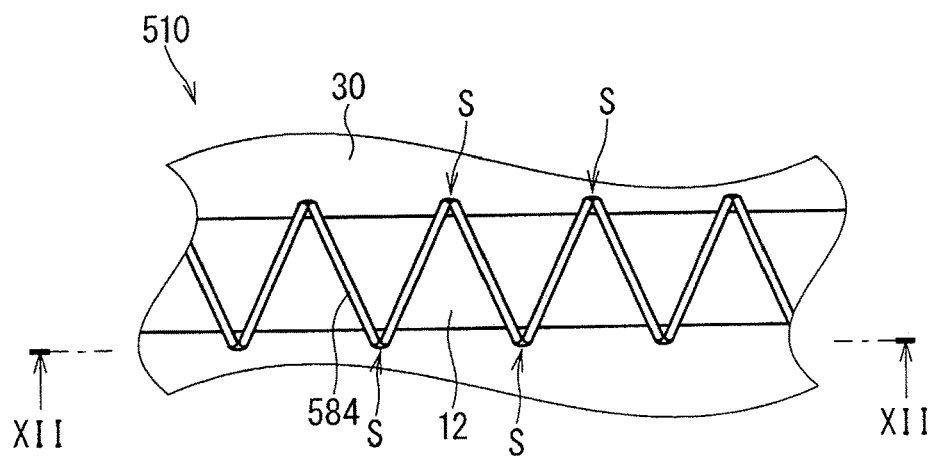
FIG. 11 illustrates a schematic plan view of a wire harness according to Embodiment 6.
Figure 12:
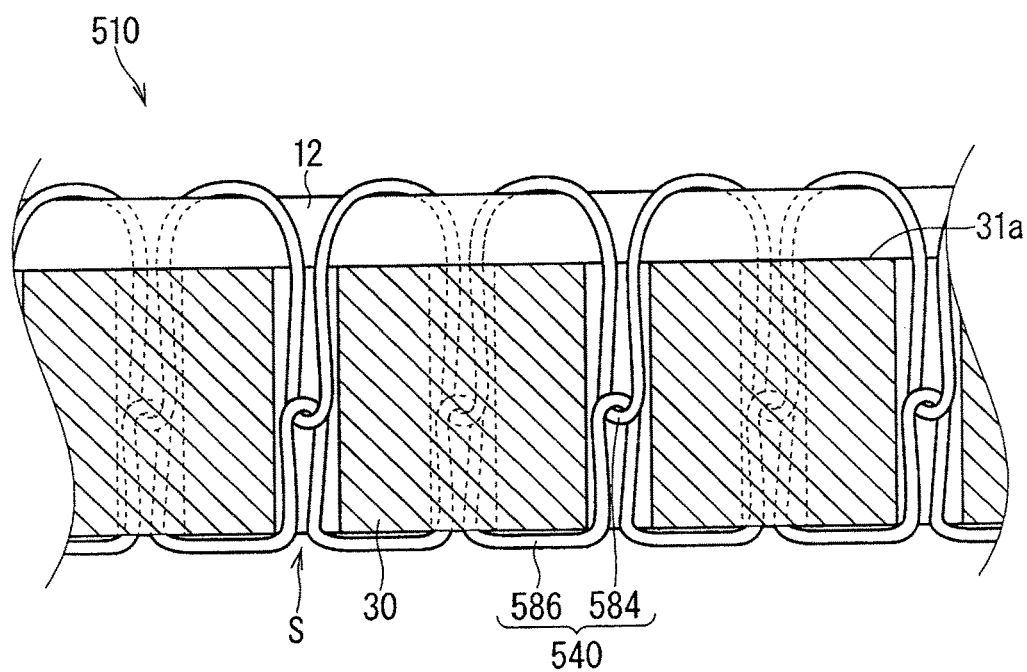
FIG. 12 illustrates a schematic cross-sectional view of the wire harness cut along an XII-XII line in FIG. 11.
Figure 13:
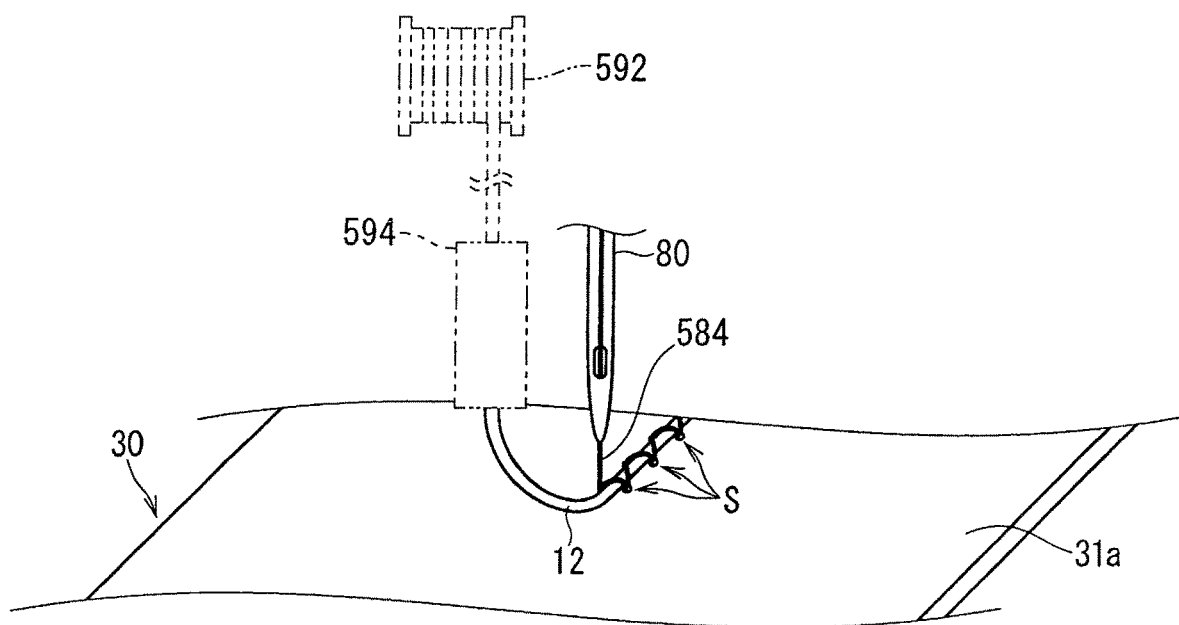
FIG. 13 illustrates steps for manufacturing the wire harness according to Embodiment 6.

Next, a wire harness 510 according to Embodiment 6 will be described. FIG. 11 is a schematic plan view of the wire harness 510 according to Embodiment 6. FIG. 12 illustrates a schematic cross-sectional view of the wire harness 510 cut along an XII-XII line in FIG. 11. FIG. 13 illustrates steps for manufacturing the wire harness according to Embodiment 6.

The wire harness 510 according to Embodiment 6 differs from the wire harness 10 according to Embodiment 1 in how to sew the electric wire 12.

Specifically, in the wire harness 10 according to Embodiment 1, the electric wire 12 is sewn with the single thread 40. The electric wire 12 is sewn as the lower thread 86 that is a machine sewing thread.

In contrast, in the wire harness 510 according to Embodiment 6, the electric wire 12 is sewn with threads 540 including an upper thread 584 and a lower thread 586. Thus, the upper thread 584 and the lower thread 586 that are machine sewing threads are provided separately from the electric wire 12. The electric wire 12 is sewn on the functional exterior component 30 with the upper thread 584 and the lower thread 586 as the threads 540.

The upper thread 584 and the lower thread 586 are sewn into the functional exterior component 30 with staggered (zig-zagged) stitches. The electric wire 12 is disposed between seams S that are mutually distant in a horizontal direction to be sandwiched between the functional exterior component 30 and one of the upper thread 584 and the lower thread 586.

A method for manufacturing such a wire harness will include the following steps (a) and (b).

The step (a) is a step of disposing the electric wire 12 on the one main surface 31a of the functional exterior component 30. For example, a guiding component 594 guides the electric wire 12 wound and housed in a bobbin 592 to the one main surface 31a of the functional exterior component 30 as illustrated in FIG. 13. For example, a known guiding component for guiding a strap to a surface of an object to be sewn can be used as the guiding component 594 in an embroidery sewing machine.

The step (b) is a step of sewing the upper thread 584 and the lower thread 586 on the functional exterior component 30 while the electric wire 12 is sandwiched between one of the upper thread 584 and the lower thread 586 and the one main surface 31a of the functional exterior component 30. The upper thread 584 and the lower thread 586 are sewn with staggered stitches with the electric wire 12 guided to the one main surface 31a of the functional exterior component 30 by the guiding component 594, while the electric wire 12, the functional exterior component 30, and the sewing machine body including the needle 80 are relatively moved in a conveying direction and the horizontal direction.

Since the electric wire 12 does not have to be used as the upper thread 584 or the lower thread 586 according to this aspect, the electric wire 12 with difficulties in being applied as the upper thread 584 or the lower thread 586, for example, a thick wire such as a power line can be easily sewn.

Since the bobbin 592 for winding and housing the electric wire 12 does not need to pass through any loop, the bobbin 592 can be upsized. The electric wire 12 to be sewn can be easily elongated.

Figure 14:
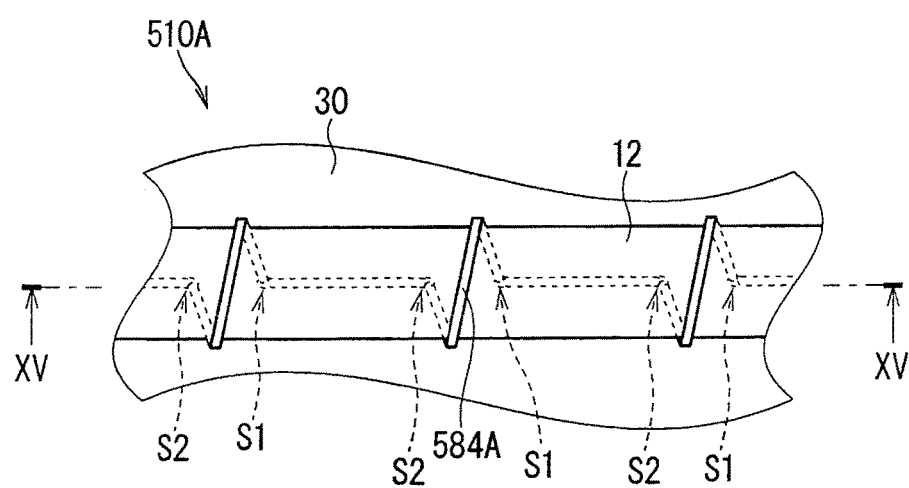
FIG. 14 illustrates a schematic plan view of a modification of the wire harness according to Embodiment 6.
Figure 15:
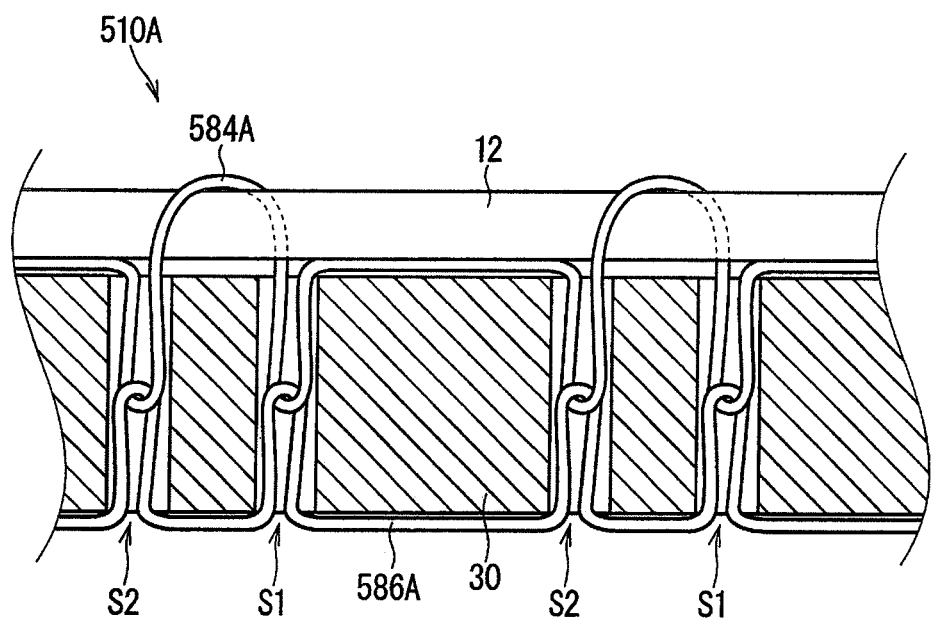
FIG. 15 illustrates a schematic cross-sectional view of the wire harness cut along an XV-XV line in FIG. 14.

When the upper thread 584 and the lower thread 586 are provided separately from the electric wire 12 and the electric wire 12 can be sewn on the functional exterior component 30 with the upper thread 584 and the lower thread 586, how to sew with the upper thread 584 and the lower thread 586 is not limited to the staggered stitches. For example, an upper thread 584A and a lower thread 586A may be sewn as a wire harness 510A according to a modification illustrated in FIGS. 14 and 15.

Specifically, the wire harness 510A according to the modification has seams S in an area of the functional exterior component 30 that overlaps the electric wire 12. At least one of portions between the adjacent seams S in one of the upper thread 584A and the lower thread 586A (the upper thread 584A in the example illustrated in FIGS. 14 and 15) is wound around the electric wire. To perform such a sewing method, the electric wire 12 or the guiding component 594 for guiding the electric wire 12 may be staggered horizontally opposite to the needle 80 when seams S1 and S2 are formed. Since the other of the upper thread 584A and the lower thread 586A (the lower thread 586A in the example illustrated in FIGS. 14 and 15) is not wound around the electric wire 12, the other one extends parallel to the electric wire 12.

Since a thread for pressing the electric wire 12 (the upper thread 584A here) can be wound around an area half the electric wire 12 or more, particularly, an area close to a full circle in the wire harness 510A, the electric wire 12 is hardly displaced from the functional exterior component 30 in the horizontal direction. Since a gap is hardly formed between the thread for pressing the electric wire 12 (the upper thread 584A here), the electric wire 12, and the functional exterior component 30, the thread for pressing the electric wire 12 (the upper thread 584A here) is hardly caught by the surrounding components.

[Modifications]

Although Embodiment 1 describes that the protective sheet has abrasion resistance, this is not necessary. The protective sheet may have penetration resistance. Here, the protective sheet has only to have penetration resistance required under a use environment of a vehicle. The needle 80 to be used when the electric wire 12 is sewn on the protective sheet may be inserted into the protective sheet with the penetration force higher than the penetration resistance.

Although Embodiment 1 describes that the functional exterior component 30 is a protective sheet, this is not necessary. The functional exterior component 30 may be a soundproof sheet (soundproof component). The soundproof sheet is, for example, a sheet component made of a nonwoven fabric or a foamed resin. When the functional exterior component 30 is a soundproof sheet, a structure for enclosing the electric wires 12 sewn on the functional exterior component 30 with the soundproof sheet is possible. This can improve the soundproofing properties. The soundproof sheet may be folded to enclose the electric wires 12, or a soundproof sheet on which the electric wires 12 are sewn and a soundproof sheet separately provided from the former soundproof sheet may sandwich the electric wires 12.

Although Embodiment 2 describes that the functional exterior component 130 is made of a metal, the functional exterior component 130 made of a metal may be used not as a shielding component but as a heat radiating component. When the functional exterior component 130 is used as a heat radiating component, the functional exterior component 130 and the electric wire 12 abutting at least in a part of an area, and at least a part of an area of the functional exterior component 130 exposed outside are probable.

Figure 16:
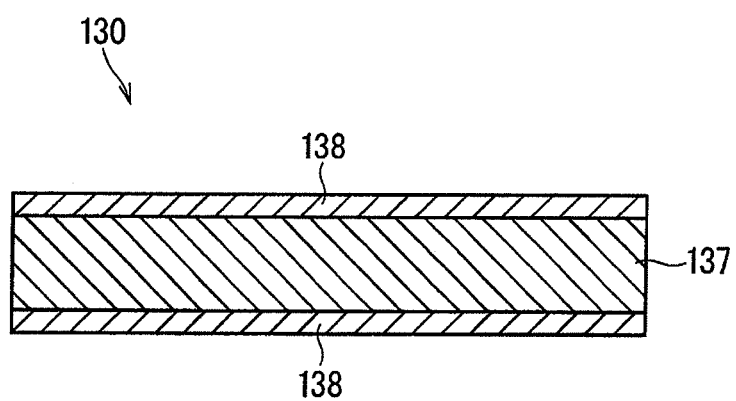
FIG. 16 illustrates a schematic cross-sectional view of a modification of a functional exterior component.

When the functional exterior component 130 is used as a heat radiating component, metals are generally superior in thermal conductivity but often inferior in emission ratio (may be referred to as emissivity). Thus, high emission ratio portions 138 may be formed on the surfaces of the functional exterior component 130 as illustrated in FIG. 16. The high emission ratio portions 138 are portions with the emission ratio higher than that of an inner portion 137.

According to Wien's displacement law, the peak wavelength of light emitted from an object through thermal radiation is inversely proportional to the temperature of the object. It is also known that the same material may have different values of the emission ratios, depending on the temperature of the object (wavelength of light). Since it is desired to increase the emission ratio of the wire harness 110 to be mounted on a vehicle, the high emission ratio portions 138 may have a higher emission ratio to correspond to the peak wavelength in a high temperature zone generated in a use environment of the vehicle.

A surface treatment for increasing the emission ratio is applied to the surfaces of the functional exterior component 130 to form the high emission ratio portions 138. The high emission ratio portions 138 will be, for example, oxide films formed by oxidizing the metal surfaces of the inner portion 137. The high emission ratio portions 138 may be, for example, plated portions or painted portions subjected to a plating process or a painting process, respectively, on the surface of a component which forms the inner portion 137. The paint to be used in the painting process may be, for example, a resin.

Although the high emission ratio portions 138 are formed on both of the main surfaces of the functional exterior component 130 in the example illustrated in FIG. 16, the high emission ratio portion 138 may be formed only on one of the main surfaces thereof. When the high emission ratio portion 138 is formed only on one of the main surfaces of the functional exterior component 130, it may be formed on the main surface on which the electric wires 12 are disposed or on the opposite main surface thereof. The high emission ratio portion 138 may be formed over the entire area of the main surface of the functional exterior component 130 or only on a part of the area thereof. When the high emission ratio portion 138 is formed only on a part of the area of the main surface of the functional exterior component 130, it may be or may not be formed on a portion on which the electric wires 12 are disposed. The high emission ratio portion 138 may be preferably formed on an outward plane of the functional exterior component 130. When the high emission ratio portion 138 is formed on a portion of the functional exterior component 130 where heat dissipation cannot be expected from conduction or convection with the wire harness 110 being mounted on a vehicle, the high emission ratio portion 138 is more effective at dissipating heat from the portion.

Formation of the high emission ratio portion enables more efficient heat radiation. Since the temperature rise in the electric wires 12 can be suppressed lower, the electric wires 12 can be downsized. Since the necessary amount of heat storage can be reduced as the amount of heat radiation in the functional exterior component 130 increases, the functional exterior component 130 can be thinned.

The functional exterior component 30 may have different tensile strengths in the first and second directions that are orthogonal to each other, among the spreading directions of the main surface of the functional exterior component 30. The direction with a higher tensile strength is preferably equal to the extension direction of the electric wires 12 in the functional exterior component 30. This is because when the wire harness 10 is mounted on a vehicle, the functional exterior component 30 may be pulled toward the extension direction of the electric wires 12 more than being pulled toward the direction orthogonal to the extension direction of the electric wires 12, and the tensile force of the former pulling may be higher than that of the latter pulling. Since particularly, making the direction with a higher tensile strength equal to the extension direction of the electric wires 12 enables the wire harness 10 to be hardly damaged even when the wire harness 10 is strongly pulled toward the extension direction, the wire harness 10 is easily mounted on the vehicle. For example, the functional exterior component 30 with such anisotropy in the tensile strength is suitable as the functional exterior component 230 according to Embodiment 3 to be used as a tension member.

The functional exterior component 30 may be any as long as the tensile strengths in the first and second directions are different. The material and the manufacturing method, etc. do not matter. For example, the functional exterior component 30 with the different tensile strengths in the first and second directions may be obtained by drawing, during manufacture, a sheet material formed by extrusion molding, such as a uniaxially oriented film or a biaxially oriented film. Filament nonwoven fabrics such as spunlaid nonwovens normally have a high tensile strength in a fiber elongation direction.

Figure 17:
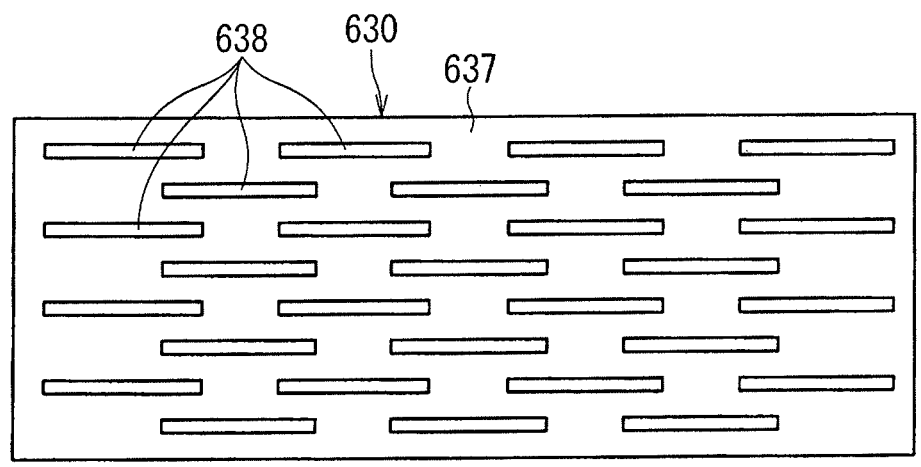
FIG. 17 illustrates a schematic plan view of another modification of the functional exterior component.

As illustrated in FIG. 17, the functional exterior component 30 may have, for example, an additional shape with the different tensile strengths in the first and second directions. In the example of a functional exterior component 630 illustrated in FIG. 17, altering the shape of compressed portions 638 yields the different tensile strengths. Specifically, the functional exterior component 630 subjected to the compression processing such as embossing includes the compressed portions 638 that are more compressed than a surrounding portion 637. Here, the compressed portions 638 are each formed with longer sides, such as rectangles or ovals. In the functional exterior component 630, the tensile strength of the compressed portions 638 along the long-side direction will be higher than the tensile strength of the compressed portions 638 along the short-side direction.

In the example illustrated in FIG. 17, a plurality of the compressed portions 638 are formed in alignment in the vertical and horizontal directions on the plane of the paper. In each of the directions, the plurality of the compressed portions 638 are oriented toward the same direction. Specifically, the plurality of the compressed portions 638 are aligned so that the short-side direction is equal to the vertical direction on the plane of the paper. The plurality of the compressed portions 638 are also aligned so that the long-side direction is equal to the horizontal direction on the plane of the paper. Here, the functional exterior component 630 may have the compressed portions 638 at least in a position of an intermediate portion along the horizontal direction on the plane of the paper, in any position along the horizontal direction on the plane of the paper as illustrated in FIG. 17, and at least in a part of an area along the vertical direction on the plane of the paper in that position. This is because if the compressed portions 638 are not formed in the position of the intermediate portion of the functional exterior component 630 along the horizontal direction on the plane of the paper and along the vertical direction on the plane of the paper in that position, the stress may concentrate on the intermediate portion with application of the tensile force to the functional exterior component 630 in the horizontal direction on the plane of the paper.

The functional exterior component 30 may have different stretchabilities in the first and second directions. When the electric wires 12 are disposed to linearly extend in a portion on which the functional exterior component 30 is attached, the direction in which the functional exterior component 30 is less stretchable is preferably equal to the extension direction of the electric wires 12. This makes it easier to maintain the electric wires 12 linearly extended. The proportion of the functional exterior component 30 for bearing the load of a part of the tensile force applied to the electric wires 12 increases as the electric wires 12 are less stretchable. Thus, it is possible to expect an advantage of the functional exterior component 30 functioning as a tension member. Since the electric wires 12 can be wound in a direction in which the functional exterior component 30 is more stretchable when the functional exterior component 30 is wound around the electric wires 12 or when the functional exterior component 30 is wound around a rod component for reinforcement with the electric wires 12 laid along the rod component, the electric wires 12 are easily wound.

When the electric wires 12 are disposed to extend with a bend in a portion on which the functional exterior component 30 is attached, the direction in which the functional exterior component 30 is more stretchable is preferably equal to the extension direction of the electric wires 12. This allows the functional exterior component 30 to follow the bend of the electric wires 12.

The functional exterior component 30 may be any as long as the stretchabilities in the first and second directions are different. The material and the manufacturing method, etc. do not matter. For example, the functional exterior component 30 with the different stretchabilities in the first and second directions may be obtained by drawing, during manufacture, a sheet material formed by extrusion molding, such as a uniaxially oriented film or a biaxially oriented film. Filament nonwoven fabrics such as spunlaid nonwovens are normally more stretchable in a direction intersecting with a fiber elongation direction.

The functional exterior component 30 may, for example, have an additional shape with the different stretchabilities in the first and second directions. In the example of the functional exterior component 630 illustrated in FIG. 17, the compressed portions 638 with the aforementioned shape in the vertical direction on the plane of the paper will be more stretchable than that in the horizontal direction on the plane of the paper.

In the first and second directions, the direction with a higher tensile strength may be equal to or different from the direction with less stretchability. In the first and second directions, different tensile strengths with the same stretchability, or the same tensile strength with different stretchabilities may be exhibited.

Although sewing each of the electric wires 12 with the thread 40 is described above, this is not necessary. A plurality of the electric wires 12 may be collectively sewn with the thread 40. Here, the plurality of the electric wires 12 may be bundled by, for example, an adhesive tape. A cable including the plurality of the electric wires 12 and a sheath covering the surrounding of the plurality of the electric wires 12 may be used.

Figure 18:
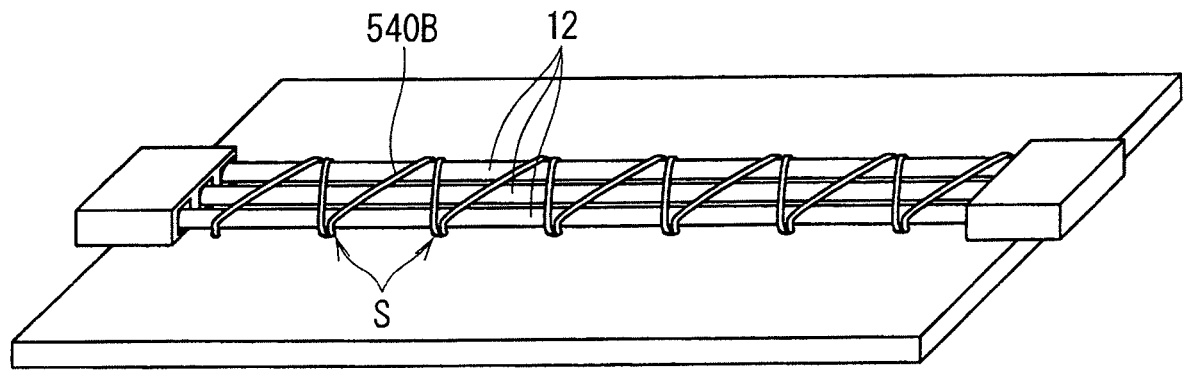
FIG. 18 illustrates a schematic perspective view of another modification of the wire harness according to Embodiment 6.

As illustrated in FIG. 18, the plurality of the electric wires 12 may be sewn with a same thread 540B while being parallel to each other. Although no seam S is formed between the electric wires 12 in the example illustrated in FIG. 18, the seam S may be formed between the electric wires 12. Consequently, the electric wires 12 are hardly displaced in the horizontal direction.

Although application of the insulation-displacement connectors 20 as the connectors 20 is described above, this is not necessary. The connectors may, for example, house crimp contacts crimped onto the ends of the electric wires 12.

The structures described in Embodiments and modifications thereof can be appropriately combined as long as they are not contradictory. For example, a functional exterior component may be a combination of a plurality of sheet materials with different functions.

Although this invention is described in detail, the foregoing description is in all aspects illustrative and does not restrict the invention. It is therefore understood that numerous modifications and variations can be devised without departing from the scope of the invention.

EXPLANATION OF REFERENCE SIGNS 10 wire harness
12 electric wire
14 core wire
16 insulating coating
20 connector
21 connector housing
22 hole
23 first component
24 second component
26 insulation-displacement contact
27 insulation-displacement part
30 functional exterior component
31a main surface
31b another main surface
40 thread
50 fastening component
52 hole
54 pillar part
56 wing part
70 mounting object
80 needle
82 eye
84 upper thread
85 loop
86 lower thread
90 bobbin

What is claimed is:

1. A wire harness, comprising:
a functional exterior component shaped into a sheet;
at least one electric wire disposed on one main surface of the functional exterior component; and
at least one thread to sew the electric wire on the functional exterior component, wherein
a connector is provided at an end of the electric wire, and a connector housing of the connector is sewn on the functional exterior component.

2. The wire harness according to claim 1,
wherein the functional exterior component includes a protector component to protect the electric wire from abrasion, the protector component having abrasion resistance.

3. The wire harness according to claim 1,
wherein the functional exterior component functions as a tension structure subjected to a tensile force applied to the electric wire.

4. The wire harness according to claim 1,
wherein in the functional exterior component, a tensile strength in a direction along an extension direction of the electric wire is higher than a tensile force in a direction orthogonal to the direction.

5. The wire harness according to claim 1,
wherein a fastener component to fasten the electric wire to a mounting object is sewn on the functional exterior component.

6. The wire harness according to claim 1,
wherein the electric wire is sewn with the thread that is a single thread.

7. The wire harness according to claim 1,
wherein the electric wire is sewn with the at least one thread including an upper thread and a lower thread.

8. A method for manufacturing the wire harness according to claim 6, the method comprising:
inserting a needle into the functional exterior component from another main surface of the functional exterior component, the needle having an eye through which the thread passes as an upper thread;
forming a loop from the upper thread that has passed through the one main surface; and
threading the electric wire through the loop as a lower thread.

9. A method for manufacturing the wire harness according to claim 7, the method comprising:
disposing the electric wire on the one main surface of the functional exterior component; and
sewing the electric wire with the upper thread and the lower thread on the functional exterior component with the electric wire being sandwiched between one of the upper thread and the lower thread and the one main surface of the functional exterior component.

10. The wire harness according to claim 1,
wherein the connector housing includes a hole or a depression through which the connector housing is sewn on the functional exterior component.

* * * * *